United States Patent [19]
Sudhoff et al.

[11] Patent Number: 5,747,904
[45] Date of Patent: May 5, 1998

[54] LOW PROFILE MOISTURE DRAIN PLUG WITH DIVERSE DRAIN PATHS FOR AN ELECTRIC MOTOR

[75] Inventors: Douglas H. Sudhoff; Donald Howard Williams, both of Madison, Ind.

[73] Assignee: Reliance Electric Industrial Company, Cleveland, Ohio

[21] Appl. No.: 731,337

[22] Filed: Oct. 18, 1996

[51] Int. Cl.$^6$ .................................................. H02K 5/10
[52] U.S. Cl. ......................... 310/88; 310/89; 310/58; 310/85
[58] Field of Search ..................... 310/88, 89, 58, 310/85; 290/48; 74/6, 7 R

[56] References Cited

U.S. PATENT DOCUMENTS

| | | | |
|---|---|---|---|
| 4,808,871 | 2/1989 | Morishita et al. | 310/89 |
| 5,053,633 | 10/1991 | Sugiyama et al. | 310/88 |
| 5,336,954 | 8/1994 | Shiroyama | 310/88 |
| 5,547,042 | 8/1996 | Platt | 184/1.5 |

FOREIGN PATENT DOCUMENTS

| | | |
|---|---|---|
| 674378 | 9/1995 | European Pat. Off. . |
| 3247112 | 7/1984 | Germany ........... 310/88 |

Primary Examiner—Thomas M. Dougherty
Assistant Examiner—B. Mullins
Attorney, Agent, or Firm—Patrick S. Yoder; John M. Miller; John J. Horn

[57] ABSTRACT

A moisture drain plug for use with a cylindrical motor housing provides a plurality of diverse drainage pathways to promote the egress of moisture from within the housing. The plurality of diverse drainage pathways includes a first set of primary moisture egress pathways and a second set of secondary moisture egress pathways. Should one or more of the primary moisture egress pathways become clogged, the secondary moisture egress pathways provide for more than adequate drainage from the motor housing.

8 Claims, 4 Drawing Sheets

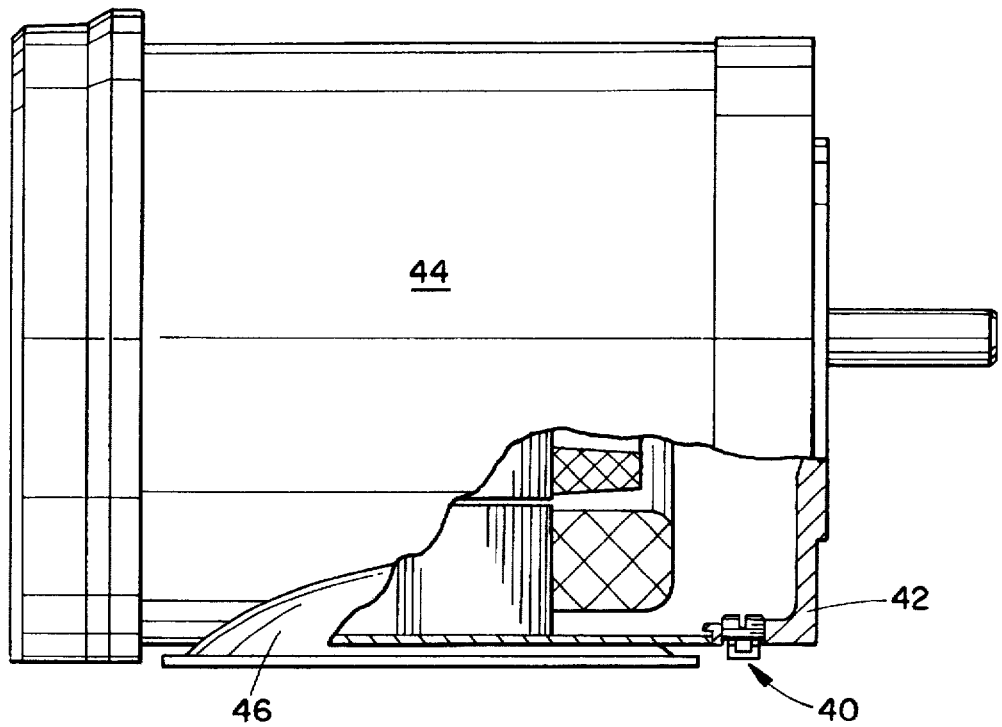
FIG. 2
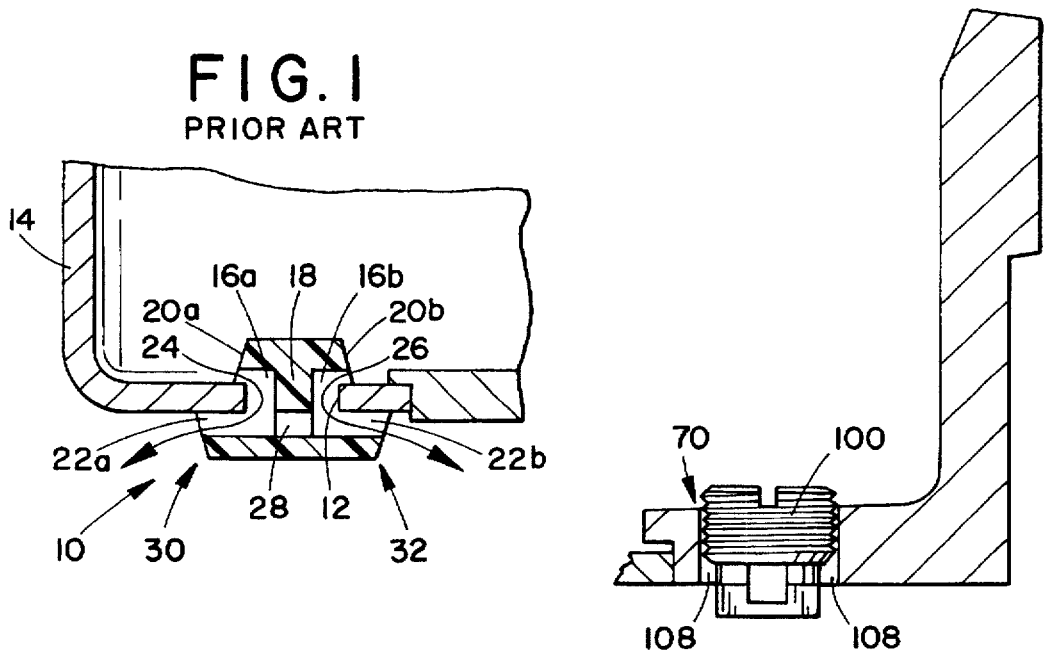
FIG. 1
PRIOR ART
FIG. 5

LOW PROFILE MOISTURE DRAIN PLUG WITH DIVERSE DRAIN PATHS FOR AN ELECTRIC MOTOR

BACKGROUND OF THE INVENTION

1. Field of the Invention

The present invention relates to the art of drain plugs for use in draining moisture from enclosures and more particularly, to low profile drain plugs adapted for use in electric motors and having diverse drain paths and a protective covering member for effectively preventing ingress of water into the motor housing.

2. Description of the Related Art

FIG. 1 illustrates one example of a conventional moisture drain plug as taught in U.S. Pat. No. 5,053,633, as stated in that patent, design goals included providing a moisture drain plug which is simple in structure, has substantially no outwardly projecting portions, i.e. low profile, and which effectively prevents ingress of water or other fluids from the outside of the motor housing.

Although the above drain plug may arguably provide a low profile solution and also offer an advantage of effectively preventing ingress of some water from the outside of the motor housing, the plug is complicated in structure, difficult to remove once installed without destroying same and deficient in providing multiple diverse drain paths for efficient ingress of water from the motor housing. The drain plug of the '633 patent does not include both a pair of primary moisture drain paths and a plurality of secondary moisture drain paths In order to appreciate the advantages of the present invention, the details of the prior art plug design shown in FIG. 1 will be discussed in detail. With reference now to that FIGURE, the plug 10 for use in a moisture drain hole 12 of a housing wall 14 comprises a stem having an inner end and an outer end and an axial length equal to the housing wall thickness. The stem further includes axial grooves 16a, 16b extending between the inner end of the stem and the outer end of the stem. The axial grooves 16a, 16b share a common partition wall 18 which serves as a dividing wall between the two axial grooves 16a, 16b.

Each of the axial grooves 16a, 16b are connected to a radial groove 20a, 20b, respectively formed in an inner flange provided on the inner end of the drain plug stem. Similarly, each of the axial grooves 16a, 16b are connected to a radial groove 22a, 22b, respectively, formed in an outer flange provided on the outer end of the drain plug stem.

The first pair of radial grooves 20a, 20b on the inner and outer flanges of the stem, in combination with the first axial groove 16 in the stem, define a first "C" shaped moisture egress pathway 24. Likewise, the second pair of radial grooves 20b, 22b on the inner and outer flanges of the stem, in combination with the second axial groove 16b in the stem, define a second "C" shaped moisture egress pathway 26.

In order to prevent water or other fluids from splashing back into the interior of the motor housing 14 through the inner radial grooves 20a, 20b, a through hole 28 is provided in the partition wall 18 in the area of the outer flange. The through hole 28 communicates the radially inner ends of the outer radial grooves 22a, 22b with each other. Accordingly, a single radial groove is formed in the outer flange which opens at the outer periphery of the outer flange at substantially diametrically opposite positions or openings 30, 32. It can be said that the single radial groove also connects the outer ends of the axial grooves 16a, 16b in the area of the outer flange.

Although the above-described prior art drain plug offers advantages over other, more primitive drain plugs such as by providing the "C" shaped moisture egress pathways described above and a through hole for preventing splashing back of fluids into the housing, one disadvantage is the limited number and type of moisture egress pathways. More particularly, the drain plug taught in U.S. Pat. No. 5,053,633 offers only a single pair of openings 30, 32 for moisture to escape from the housing. Should either or both of those openings become blocked or otherwise restricted, moisture could accumulate in the motor housing and cause damage to the motor.

In addition to the above disadvantages, the prior art drain plug is difficult to manufacture due to its complex design and, because of the complex pathways, is difficult to clean when the passageways become clogged with debris.

SUMMARY OF THE INVENTION

Accordingly, it is an object of the present invention to provide a moisture drain plug for use with an enclosure, such as an electric motor housing, which overcomes the above described problems found in the prior art.

It is a further object of the present invention to provide a moisture drain plug having a plurality of diverse drain paths to provide a variety of secondary or alternative moisture egress pathways, should one or more of the primary pathways become clogged with debris from within the motor housing. The present invention offers the advantage of providing multiple "backup" moisture egress pathways for moisture to escape the housing regardless of the condition of the one or more "primary" moisture egress pathways.

It is still a further object of the invention to provide a low profile moisture drain plug which has only a slight outwardly projecting portion or member. In this way, the present invention realizes an optimal placement of the drain plug at a lowest point location on the motor housing where moisture or other fluids are most likely to accumulate within the housing.

It is yet another object of the present invention to provide a moisture drain plug that is easily installed into a motor housing and easily removed therefrom should servicing or changing of the plug become necessary.

It is still yet another object of the present invention to provide a moisture drain plug which is easily manually installed into a motor housing using no special tools. Similarly the preferred embodiment is manually removable from the motor housing for servicing or cleaning purposes.

It is still further an object of the present invention to provide a moisture drain plug which includes a protective covering member to prevent the entry of fluids into the motor housing as the motor is "washed down" or under other conditions when the motor is exposed to a moving stream of water or other fluid flows in the area of the drain plug.

It is another further object of the invention to provide a moisture drain plug which is easy to manufacture and which is rugged in construction.

To these ends, according to the present invention, there is provided a moisture drain plug adapted to be inserted into a moisture drain hole defined in a housing wall of an electric motor. The moisture drain plug comprises a substantially cylindrical body member defining an inner end and an outer end and including an internal axial passageway having an inner end and an outer end and extending between the inner end of the body member and the outer end of the body member. The drain plug further includes an outer cover member having a substantially flat rectangular inner surface radially extending from the outer end of the body member.

The inner end of the body member has a diameter substantially equivalent to the diameter of the drain hole in the housing wall and the outer end of the body member has a diameter less than the diameter of the drain hole in the housing wall to thereby define an annular passageway between the outer end of the body member and the drain hole. The rectangular outer cover member has a first dimension larger that the diameter of the drain hole and a second dimension substantially corresponding to the diameter of the outer end of the body member. Also, the inner surface of the outer cover member includes a radial groove extending across the outer cover member to open at the outer periphery of the outer cover member at substantially diametrically opposite positions. The outer radial groove is connected, i.e. in fluid communication with, both the axial groove and the annular passageway whereby when the drain plug is inserted within the drain hole in the housing wall, a pair of primary moisture egress paths are formed via the axial passageway and the radial groove and a set of auxiliary moisture egress paths are formed via the axial passageway, the annular passageway, and the minor dimension of the outer cover member which substantially corresponds to the diameter of the outer end of the body member.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein:

FIG. 1 is a sectional view of an example of a moisture drain plug according to the teachings of the prior art;

FIG. 2 is a side view of a standard electric motor partially in section illustrating the use of the low profile moisture drain plug according to the present invention;

FIG. 5 is an enlarged view of a portion of the sectional view shown in FIG. 1 illustrating the drain plug according to the first preferred embodiment of the present invention installed in a drain hole of a motor housing;

DETAILED DESCRIPTION OF THE PREFERRED EMBODIMENTS

With reference now to the drawings wherein showings are for purposes of illustrating the preferred embodiments of the invention only and not for purposes of limiting same, FIG. 2 shows a low profile moisture drain plug 40 with diverse drain pathways according to the present invention. The drain plug is especially useful in connection with providing drainage in a cylindrical housing 42 of an electric motor 44 and will be described with particular reference thereto. However, it is to be appreciated that the drain plug could be used in any application where there is a need for the release of undesirable moisture build up from within curved or flat bottom enclosures.

Because of its low profile structure as shown in that FIGURE, the drain plug 40 is well suited for mounting in the motor 44 at the lowest point in the bottom of the cylindrical housing 42 in order to provide a plurality moisture egress pathways in an area of the housing most likely to accumulate moisture or other fluids. The low profile structure enables the plug to be located on the housing in the narrow space created by the motor mounting flange 46 or by other motor mounting apparatus.

Figure 3:
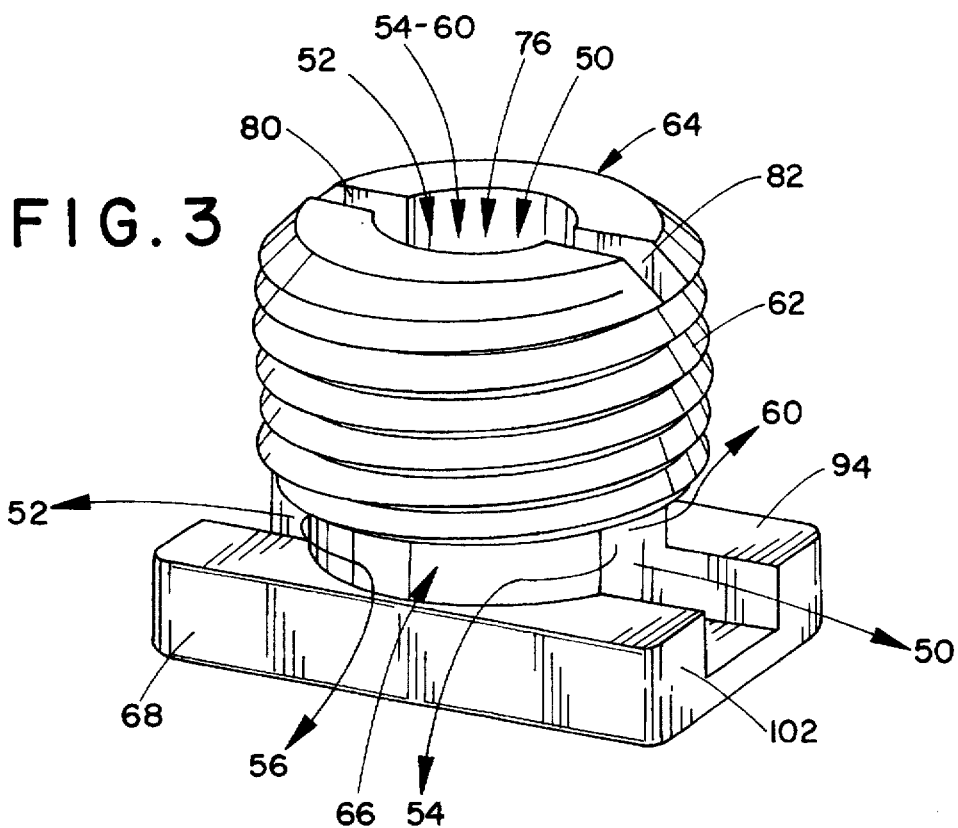
FIG. 3 is a first perspective view of the low profile moisture drain plug according to a first preferred embodiment of the present invention.
Figure 4:
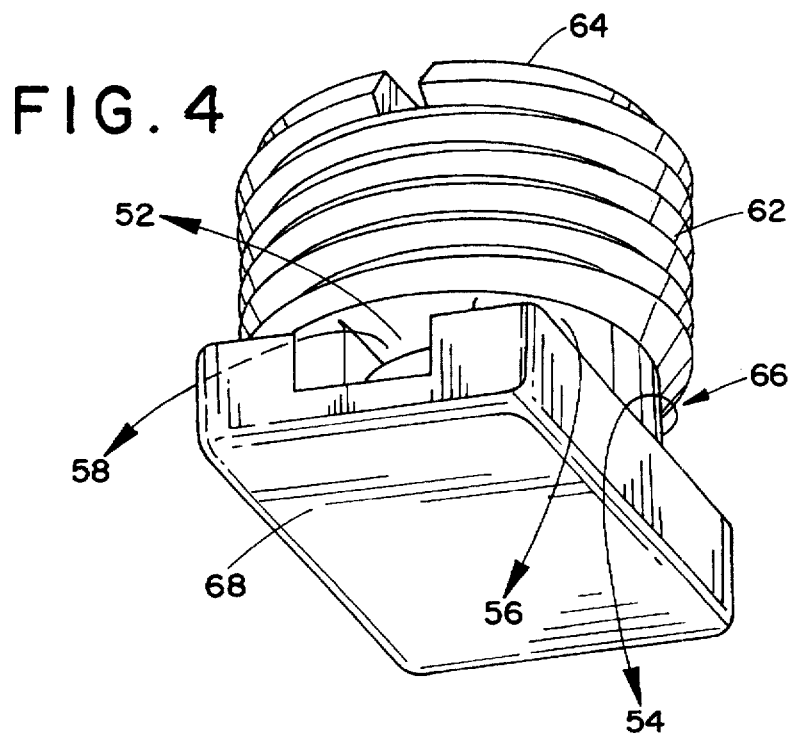
FIG. 4 is a second perspective view of the low profile moisture drain plug according to the first preferred embodiment of the present invention.
Figure 6:
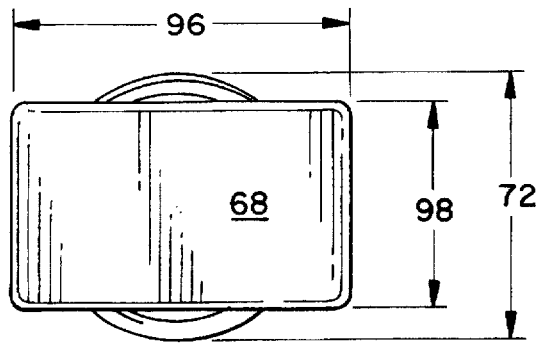
FIG. 6 is a bottom plan view of the low profile moisture drain plug according to the first preferred embodiment of the present invention.
Figure 7:
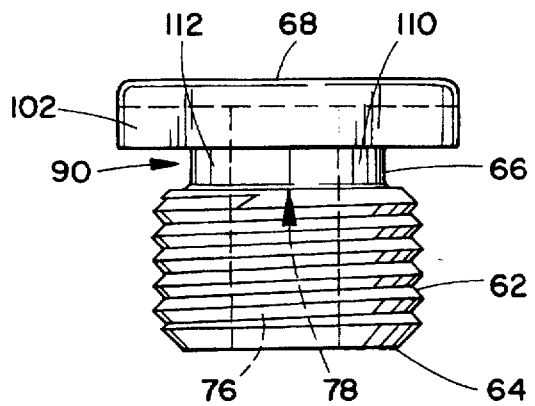
FIG. 7 is a front plant view of the low profile moisture drain plug according to the first preferred embodiment of the present invention.
Figure 9:
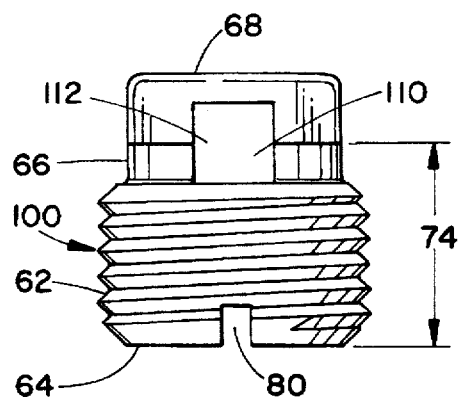
FIG. 9 is a side plan view of the low profile moisture drain plug according to the first preferred embodiment of the present invention.
Figure 8:
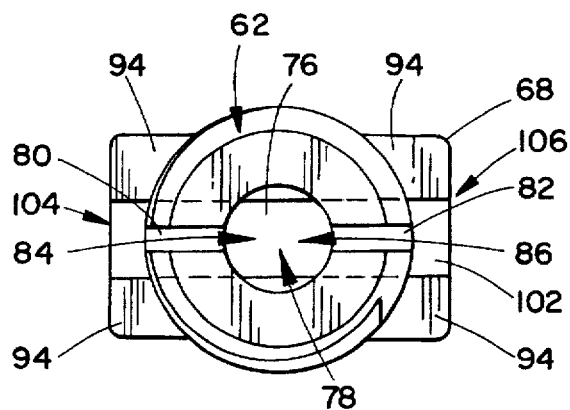
FIG. 8 is a top plan view of the low profile moisture drain plug according to the first preferred embodiment of the present invention.
Figure 10:
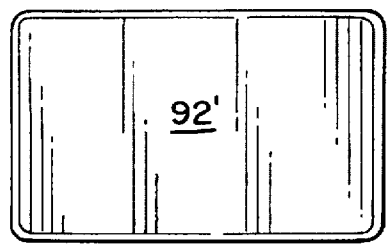
FIG. 10 is a bottom plan view of the low profile moisture drain plug according to a second preferred embodiment of the present invention.
Figure 11:
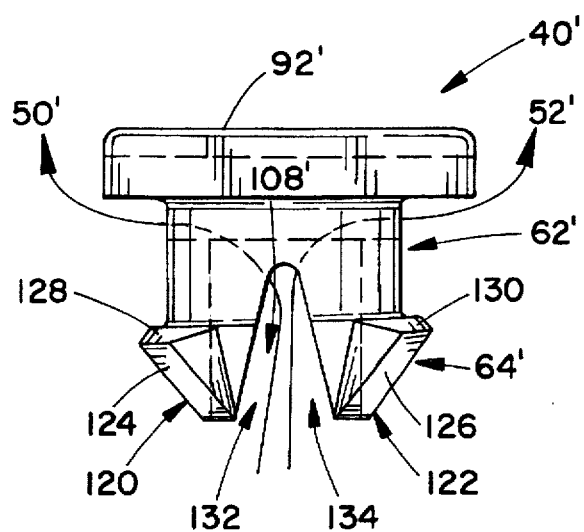
FIG. 11 is a front plan view of the low profile moisture drain plug according to the second preferred embodiment of the present invention.
Figure 13:
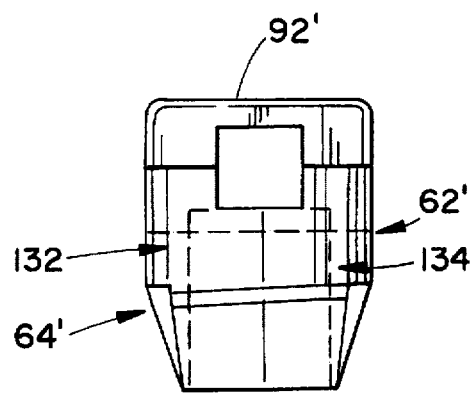
Figure 12:
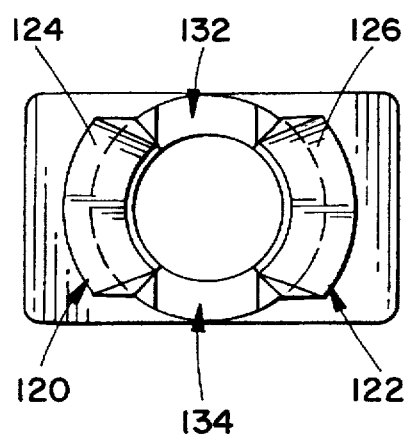
FIG. 12 is a top plan view of the low profile moisture drain plug according to the second preferred embodiment of the present invention; and, FIG. 13 is a side plan view of the low profile moisture drain plug according to the second preferred embodiment of the present invention.

FIGS. 3 and 4 illustrate a pair of perspective views of a first preferred embodiment of the moisture drain plug according to the present invention. Those FIGURES are particularly useful in describing the moisture egress pathways provided by the present invention including the novel combination of a pair of primary moisture egress pathways 50, 52 and a plurality of auxiliary moisture egress pathways 54, 56, 58, and 60. FIGS. 3 and 4 also illustrate a feature of the novel "T" shaped construction of the drain plug whereby the plug may be manually installed into a motor housing without the need for special tools.

With continued reference to the above FIGURES and in addition to FIGS. 5-9, the moisture drain plug includes a body member 62 having an inner end 64 and an outer end 66. An outer protective cover member 68 is attached to the outer end 66 of the body member as shown. Preferably, the moisture drain plug is of a unitary construction as illustrated and made of a durable, chemical and heat resistant material such as Zytel ST801 nylon available from E. I. duPont deNemours & Co. or Valox 357 available from General Electric although other materials and constructions may be used such as forming the body member 62 of brass and the outer cover member 68 of aluminum and press-fitting or welding the two components into a single construction or by machining or die casting the drain plug from a single material such as aluminum.

The body member 62 is adapted to fit into a moisture drain hole 70 (FIG. 5) of an electric motor and as such is preferably substantially cylindrical in profile as most drain holes are formed simply by first drilling a round hole in a motor housing. The overall dimensions of the cylindrical moisture drain plug including the diameter 72 of the body member in the radial direction and the overall length 74 of the body member in the axial direction are selected to substantially correspond to the size of the moisture drain hole 70. A single axial groove 76 is formed in the body member defining a first fluid passageway 78 connecting the inner end 64 of the body member to the outer end 66 of the body member.

In order to compensate for variations between motor types with regard to the thickness of the respective motor housing constructions, at least one radial groove 80, and preferably a pair of radial grooves 80, 82 are formed in the inner end 64 of the body member 62. As shown in the figures, the pair of radial grooves 80, 82 cooperate with the first fluid passageway 78 to provide a pair of internal moisture egress pathways 84, 86 within the cylindrical motor housing 42. In that manner, any moisture in the bottom of the housing otherwise unable to escape therefrom due to that portion of the body member extending beyond the housing wall thickness and into the housing, essentially a moisture dam, is provided a set of egress alternatives, namely the pair of internal moisture egress pathways 84, 86.

The outer end 66 of the body member 62 includes a reduced diameter region 90 to which is attached the outer cover member 68. The outer cover member has a substantially flat rectangular inner surface 94 having a first dimension 96 substantially larger than the diameter of the drain hole 70 and a second dimension 98 substantially corresponding to the diameter of the body member in the reduced diameter region 90. The first dimension 96 of the outer cover member radially extends from the outer end 66 of the body member to an extent that the inner surface 94 is made to engage the housing 42 creating an interface therebetween as the plug 40 is connected to the housing by means of threads 100 on the body member and corresponding threads (not shown) in the drain hole 70. The threads 100 are preferably straight-cut pipe threads, rather than taper-cut, to ensure that the inner surface 94 of the cover member 68 engages the housing before the body member tightens within the drain hole 70.

The inner surface 94 of the outer cover member 68 includes a radial groove 102 extending across the first dimension 96 of the cover member to open at the outer periphery of the cover member at substantially diametrically opposite first 104 and second 106 positions. The radial groove 102 is in fluid communication with the first fluid passageway 78 within the body member 62.

In addition to the above, the radial groove 102 is in fluid communication with an annular passageway 108, best shown in FIG. 5, created by the clearance between the reduced diameter region 90 and the motor housing 42 when the inner surface 94 of the outer cover member 68 is seated against the outer surface of the motor housing 42. Further, a pair of radial grooves 110, 112 are formed on the outer end 66 of the body member 62 in the reduced diameter region 90 to provide enhanced fluid flow from the first fluid passageway 78 into the annular passageway 108.

The enhanced fluid flow enabled by the pair of radial grooves 110, 112 assists in providing for the plurality of secondary moisture egress pathways 54–60. It is an advantage of the present invention that the secondary pathways 54–60 operate to drain fluids from the enclosure even when the primary moisture egress pathways 50, 52 may be clogged with debris or other matter. In addition, the integrity of the secondary moisture pathways 54–60 against the ingress of fluids, such as may occur during a motor "spray down" procedure, is aided by the complicated, multidirectional nature of the annular passageway 108. In order for water to enter the housing through any of the secondary moisture egress pathways 54–60, it must first move axially with respect to the body member around the cover member 68 and into the annular passageway 108 between the reduced diameter region 90 and the motor housing 42. From there, the water must make a perpendicular turn and travel circumferentially along the annular passageway until reaching the opening in one of the pair of radial grooves 110, 112, whereupon yet another perpendicular turn is required in order to travel radially inwardly into the pair of grooves 110, 112 toward the first fluid passage 78. Lastly, in order to travel toward the inner end 64 of the drain plug, the fluid must make still yet another perpendicular turn from traveling radially inwardly in the groove 110, 112 to travel in the radial direction in the first fluid passage 78.

FIGS. 10–13 illustrate a second preferred embodiment of the present invention adapted for push in installation and snap lock engagement with smooth bore drain holes in motor housings or other enclosures With reference now to those FIGURES, the second preferred embodiment comprises a novel drain plug 40' including a cover member 68' substantially as described above in connection with the first preferred embodiment, and a body member 62' adapted on its inner end 64' with a plurality of resiliently biased spring clips, preferably a pair 120, 122.

Each of the spring clips 120, 122 has a front frustroconical face surface 124 126 respectively and a rear frustroconical face surface 128, 130, respectively. The front face surfaces 124, 126 are tapered radially inwardly on the inner end 64' of the body member and as such provide an excellent ramp surface for engaging a smooth bore drain hole in a housing. As the plug 40' is pushed into the drain hole, each of the spring clips 120, 122 bend radially inwardly due to the interaction between the front face surfaces 124, 126 and the drain hole. A pair of radial grooves 132, 134, preferably "V" shaped, are provided on the inner end 64' of the body member to accommodate the radial inward extent of travel of the spring clips 120, 122.

The rear surfaces 128, 130 of the spring clips are preferably found with a slight taper to accommodate slight variations in the wall thickness of the target housings. Ideally, the distance between the inner surface 94' of the outer cover member 68' and the rear surfaces 128, 130 of the spring clips 120, 122 is selected to precisely match the wall thickness of the housing at the drain hole. However, by providing a slight taper to the rear face surfaces 128, 130, a positive snap lock engagement is achieved across a range of housing wall thicknesses.

Lastly, in connection with the embodiment illustrated in FIGS. 10–13, it is to be pointed out that the annular passageway 108' is provided by selecting the diameter of the body member 62' to be slightly less than the smooth bore diameter of the targeted drain hole. In that way, similar to the first preferred embodiment, both sets of moisture egress pathways are established including the primary moisture egress pathways 50', 52' and the secondary moisture egress pathways 54', 56', 58' and 60'.

While particular embodiments of the present invention have been shown and described, it should be clear that changes and modifications may be made to such embodiments without departing from the true scope and spirit of the invention. It is intended that the appended claims cover all such changes and modifications.

Having thus described the invention, we now claim:

1. A moisture drain plug adapted to be inserted into a moisture drain hole defined in a housing wall of an electric motor, the moisture drain plug comprising:

a body member defining an inner end and an outer end and including an internal passageway having an inner end and an outer end and extending intermediate said inner end of the body member and said outer end of the body member, a portion of the body member configured to be received in the drain hole having dimensions substantially equivalent to dimensions of the drain hole, the outer end of the body member having dimensions less than the dimensions of the drain hole to define a peripheral passageway between the outer end of the body member and the drain hole and a first radial groove in said body member connecting said internal passageway with said peripheral passageway; and, an outer cover member having an inner surface of larger dimensions than the dimensions of the drain hole and radially extending from said outer end of said body member, said inner surface of said outer cover member having a second radial groove extending across said outer cover member to open at the outer periphery of said outer cover member, said second radial groove being connected to said internal passageway and to said peripheral passageway;

whereby, when said drain plug is inserted within said drain hole in said housing, said internal passageway and said second radial groove define a first continuous but curved moisture drain path extending first through said internal passageway and then through said second radial groove and further, said peripheral passageway and said internal passageway define a second continuous but curved moisture drain path extending first through said internal passageway, then exiting said housing through said first radial groove and said peripheral passageway.

2. The moisture drain plug according to claim 1, wherein the body member includes a threaded portion between the inner end and the outer end thereof, the threaded portion being configured to cooperate with said housing wall to maintain the drain plug within the drain hole.

3. The moisture drain plug according to claim 1, wherein the body member includes a plurality of spring clips between the inner end and the outer end thereof, said spring clips being configured to cooperate with said housing wall to maintain the drain plug within the drain hole.

4. The moisture drain plug according to claim 1, wherein said first radial groove is contiguous with said second radial groove.

5. A moisture drain plug adapted to be inserted into a moisture drain hole defined in a housing wall of an electric motor, the moisture drain plug comprising:

a substantially cylindrical body member defining an inner end and an outer end and including an internal axial passageway having an inner end and an outer end and extending between said inner end of the body member and said outer end of the body member, the inner end of the body member having a diameter substantially equivalent to the diameter of the drain hole and the outer end of the body member having a diameter less than the diameter of the drain hole to define an annular passageway between the outer end of the body member and the drain hole and a first radial groove in said substantially cylindrical body member connecting said internal axial passageway with said annular passageway; and, an outer cover member having a substantially flat rectangular inner surface having a first dimension larger than the diameter of the drain hole and radially extending from said outer end of said body member and a second dimension substantially corresponding to the diameter of the outer end of the body member, said inner surface of said outer cover member having a second radial groove extending across said outer cover member to open at the outer periphery of said outer cover member at substantially diametrically opposite first and second positions, said second radial groove being connected to said internal axial passageway and to said annular passageway;

whereby, when said drain plug is inserted within said drain hole in said housing, said internal axial passageway and said second radial groove define a first continuous but curved moisture drain path extending first through said internal axial passageway and then substantially along said wall exiting said housing through said second radial groove and further, said annular passageway, said first radial groove and said internal axial passageway define a second continuous but curved moisture drain path extending first through said internal axial passageway, then said first radial groove and then exiting said housing through said annular passageway.

6. The moisture drain plug according to claim 5 wherein said internal axial passageway, said first radial groove and said annular passageway define a pair of second continuous but curved moisture drain paths, each of said pair of second moisture drain paths extending first through said internal axial passageway and then around a portion of said annular passageway.

7. The moisture drain plug according to claim 5, wherein said internal axial passageway and said second radial groove define a pair of first continuous but curved moisture drain paths, said pair of first moisture drain paths extending first through said internal axial passageway and then through said second radial groove to said first and second positions, respectively.

8. The moisture drain plug according to claim 5 wherein:

said internal axial passageway and said second radial groove define a pair of primary moisture drain paths, said pair of primary moisture drain paths extending first through said internal axial passageway and then through said second radial groove to said first and second positions, respectively; and, said internal axial passageway, said first radial groove and said annular passageway define a plurality of secondary moisture drain paths extending first through said internal axial passageway and then through said first radial groove and then around a portion of said annular passageway.

\* \* \* \* \*